2 Sheets—Sheet 1.

F. S. SHIRLEY.
Manufacture of Glass Molds.

No. 240,615.  Patented April 26, 1881.

2 Sheets—Sheet 2.

F. S. SHIRLEY.
Manufacture of Glass Molds.

No. 240,615. Patented April 26, 1881.

Witnesses

Inventor
F. S. Shirley
per
F. A. Lehmann,
Atty.

United States Patent Office.

FREDERICK S. SHIRLEY, OF NEW BEDFORD, MASSACHUSETTS.

MANUFACTURE OF GLASS-MOLDS.

SPECIFICATION forming part of Letters Patent No. 240,615, dated April 26, 1881.

Application filed April 15, 1878.

*To all whom it may concern:*

Be it known that I, FREDERICK S. SHIRLEY, of New Bedford, in the county of Bristol and State of Massachusetts, have invented certain new and useful Improvements in Manufacture of Glass-Molds; and I do hereby declare the following to be a full, clear, and exact description of the invention, such as will enable others skilled in the art to which it pertains to make and use it, reference being had to the accompanying drawings, which form part of this specification.

My invention relates to an improvement in manufacture of glass-molds; and it consists in making the molds in which the articles are to be blown or pressed by an electrotype process, whereby very fine lines are produced, and thus enabling costly designs to be copied at a very small cost, as will be more fully described hereinafter.

Figure 1:
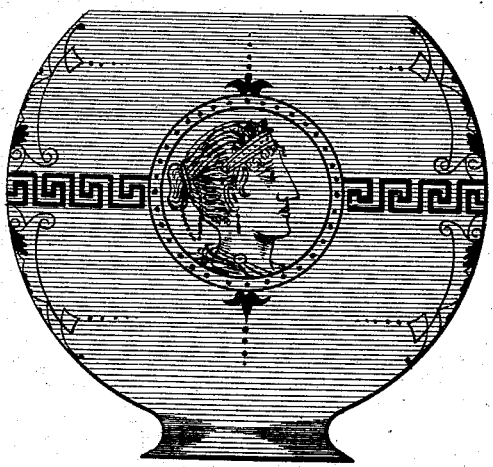
Figure 2:
Figure 3:
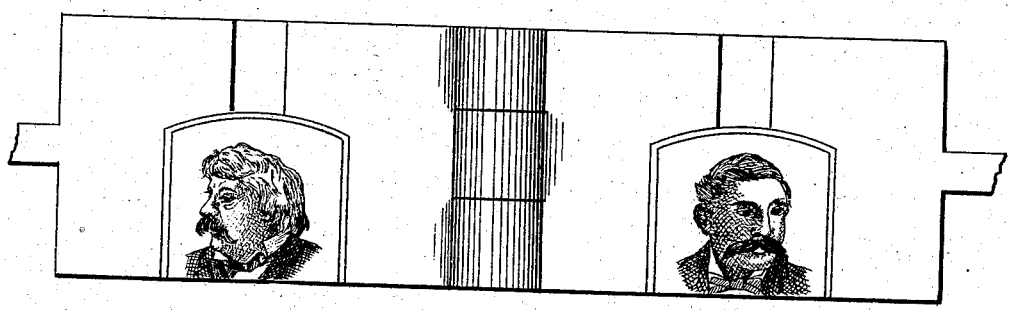

Figures 1 and 2 show samples of the work produced from my molds. Fig. 3 is a side elevation of a mold produced by my process.

I first take a wooden or other model having a design figured thereon and prepare the same by coating with plumbago or other conducting-coating, and then put it in a battery and cover it with copper or some hard metallic alloy. This coating requires to be done very thickly, and after it has been freely washed is recoated, so that the deposit may be uniform and not flake. When some substance has been given to the copper coating, I take flat-headed studs and apply heads to it at short distances apart, and again coat the whole model over with metal. The heads become so firmly embedded in the coating as to form a part of it, and when the coating is sufficiently strong I remove the same and divide it into the necessary sections for making a practical mold, and then form a mold in plaster from them. The shell-metals are left on the plaster mold for molding purposes. When the mold for casting is ready the plates are removed from plaster form, and the studs on their backs are bent so as to form a strong and firm attachment to the metal cast into them, thus forming a finished mold, at a small cost, with fine reticulated lines thereon.

I also obtain similar results by other means, viz: I coat the former or mold, made of any suitable material, with a non-conducting composition or varnish, and then trace out the required designs, removing the coating where the raised lines are required, and insert at salient points conducting-pins, which aid in holding the coating firmly to the surface. By coating the parts intended to be left raised with a proper resisting-coating on the surface of the mold and then exposing the uncovered parts, the raised lines are left, as designed. Each of these methods is accomplished more cheaply than by cutting out with chisels and tools of similar description.

My process also covers molds where the ornamental parts are recessed instead of being raised lines, so that when the articles are blown or otherwise formed the designs form figures in cameo. These figures in relief may form a continuous belt or simply paneled cameos, as may be preferred. These can also be made on plain iron molds, or any other suitable metal; but the small surface necessary to be left being then eased, the projecting surfaces above the general face have to be cut and worked out, thus making the molds very expensive and increasing the cost of the articles produced therefrom.

I take these molds having fine-line designs thereon and blow or press my articles of glassware therein, and the articles thus produced will have all the fine lines impressed therein. These indented lines or traceries may be of any depth or fineness desired.

By this process of forming the molds I produce a mold at very slight expense in which articles of glassware are produced having the finest lines and traceries indented in them, thus giving the appearance of etched ware.

Having thus described my invention, I claim—

1. The process herein described of forming a mold for blowing or pressing glassware, consisting in taking a former or mold having the design cut, engraved, or otherwise produced thereon, covering it with plumbago or its equivalent, then coating it with a suitable metal in a battery any suitable number of times, then removing the whole shell thus formed, and forming a plaster or other mold, substantially as set forth.

2. A mold of any suitable material having raised-line designs thereon, produced by electro-deposit, either direct on the plain surface of such mold or by making a shell of deposited metal and attaching same in any suitable manner to an outer case by casting or other means, substantially as described.

3. A mold having raised or sunk designs thereon, produced by a deposit of suitable metals on working-face of same, substantially as specified.

In testimony that I claim the foregoing I have hereunto set my hand this 4th day of April, 1877.

FRED. S. SHIRLEY.

Witnesses:
  R. M. BARR,
  JOSEPH C. WILDMAN.